(12) United States Patent
Jin et al.

(10) Patent No.: US 10,612,856 B2
(45) Date of Patent: Apr. 7, 2020

(54) HEAT EXCHANGER AND AIR CONDITIONING SYSTEM

(71) Applicant: DANFOSS MICRO CHANNEL HEAT EXCHANGER (JIAXING) CO., LTD., Zhejiang (CN)

(72) Inventors: Junfeng Jin, Zhejiang (CN); Huan Jin, Zhejiang (CN)

(73) Assignee: DANFOSS MICRO CHANNEL HEAT EXCHANGER (JIAXING) CO., LTD., Zhejiang (CN)

( * ) Notice: Subject to any disclaimer, the term of this patent is extended or adjusted under 35 U.S.C. 154(b) by 51 days.

(21) Appl. No.: 16/063,756

(22) PCT Filed: Aug. 1, 2016

(86) PCT No.: PCT/CN2016/092689
§ 371 (c)(1),
(2) Date: Jun. 19, 2018

(87) PCT Pub. No.: WO2017/107490
PCT Pub. Date: Jun. 29, 2017

(65) Prior Publication Data
US 2019/0212061 A1    Jul. 11, 2019

(30) Foreign Application Priority Data
Dec. 24, 2015   (CN) .......................... 2015 1 0988023

(51) Int. Cl.
*F28D 9/02*     (2006.01)
*F28D 1/047*    (2006.01)
(Continued)

(52) U.S. Cl.
CPC .......... *F28D 1/0476* (2013.01); *F24F 1/0059* (2013.01); *F24F 12/002* (2013.01);
(Continued)

(58) Field of Classification Search
CPC .. F28D 1/0476; F28D 1/0233; F28D 15/0266; F25B 39/02; F25B 39/04;
(Continued)

(56) References Cited

U.S. PATENT DOCUMENTS 2,301,433 A    11/1942  McElgin
6,158,499 A  * 12/2000  Rhodes ................. F24F 5/0017
                                                       165/10
(Continued)

FOREIGN PATENT DOCUMENTS

CN    101806550 A    8/2010
CN    102135350 A    7/2011
(Continued)

OTHER PUBLICATIONS

Supplementary Partial European Search Report for Serial No. EP 16 87 7302 dated Mar. 15, 2019.
(Continued)

*Primary Examiner* — Davis D Hwu
(74) *Attorney, Agent, or Firm* — McCormick, Paulding & Huber PLLC (57) ABSTRACT

A heat exchanger (100) comprises: a first header tube (1) and two second header tubes (3); a first heat exchange tube (51) in fluid communication with one of the two second header tubes (3) and a second chamber (B) of the first header tube (1); a first runner tube (61) in fluid communication with the one of two second header tubes (3) and a first chamber (A) of the first header tube (1); a second heat exchange tube (52) in fluid communication with the other of the two second header tubes (3) and the first chamber (A) of the first header tube (1); and a second runner tube (62) in fluid communication with the other of the two second header tubes (3) and the second chamber (B) of the first header tube (1). The heat exchanger (100) bends at a first bending portion (71)
(Continued)

between the other of the two second header tubes (3) and the first header tube (1), so as to enable the other of the two second header tubes (3) to be higher or lower than the first header tube (1).

29 Claims, 10 Drawing Sheets

(51) Int. Cl.
*F28D 15/02* (2006.01)
*F25B 39/00* (2006.01)
*F24F 1/0059* (2019.01)
*F28D 1/053* (2006.01)
*F28D 1/02* (2006.01)
*F28D 1/04* (2006.01)
*F24F 12/00* (2006.01)
*F25B 39/02* (2006.01)
*F25B 39/04* (2006.01)
*F28D 21/00* (2006.01)

(52) U.S. Cl.
CPC .............. *F25B 39/00* (2013.01); *F25B 39/02* (2013.01); *F25B 39/04* (2013.01); *F28D 1/024* (2013.01); *F28D 1/0233* (2013.01); *F28D 1/0443* (2013.01); *F28D 1/0471* (2013.01); *F28D 1/05391* (2013.01); *F28D 15/025* (2013.01); *F28D 15/0266* (2013.01); *F24F 2012/005* (2013.01); *F28D 2021/0028* (2013.01); *F28D 2021/0068* (2013.01)

(58) Field of Classification Search
CPC . F25B 39/00; F24F 5/0017; F24F 1/18; F24F 9/0202; F24F 1/02; F24F 2280/04
USPC ........................................................ 165/173
See application file for complete search history.

(56) References Cited

U.S. PATENT DOCUMENTS

| | | | |
|---|---|---|---|
| 2003/0066633 A1* | 4/2003 | Lee | .................. F25B 39/02 |
| | | | 165/144 |
| 2006/0048928 A1 | 3/2006 | Maezawa et al. | |
| 2007/0204978 A1 | 9/2007 | Beamer | |
| 2011/0139425 A1 | 6/2011 | Beamer | |
| 2017/0314792 A1* | 11/2017 | Jindou | .................. F25B 39/00 |

FOREIGN PATENT DOCUMENTS

| | | |
|---|---|---|
| CN | 205300044 U | 6/2016 |
| EP | 1762808 A1 | 3/2007 |
| WO | 2010112392 A1 | 10/2010 |

OTHER PUBLICATIONS

International Search Report for PCT Serial No. PCT/CN2016/092689 dated Nov. 7, 2016.

* cited by examiner

HEAT EXCHANGER AND AIR CONDITIONING SYSTEM

CROSS-REFERENCE TO RELATED APPLICATIONS

This application is a National Stage application of International Patent Application No. PCT/CN2016/092689, filed on Aug. 1, 2016, which claims priority to Chinese Patent Application No. 201510988023.2, filed on Dec. 24, 2015, each of which is hereby incorporated by reference in its entirety.

TECHNICAL FIELD

The embodiments of the present invention relate to a heat exchanger and an air conditioning system.

BACKGROUND

Electronic devices such as telecommunication devices require heat exchangers or heat pipes, for example, heat pipes without motive power, for heat radiation.

SUMMARY

One objective of the embodiments of the present invention is to provide a heat exchanger and an air conditioning system so that evaporation and condensation, for example, are completed in the same heat exchanger and a height difference provides a motive power source for internal circulation to complete the two cycles of evaporation and condensation of a refrigerant.

Another objective of the embodiments of the present invention is to provide a heat exchanger that can be used for a specific purpose, for example, in a specific position.

The embodiments of the present invention provide a heat exchanger. The heat exchanger comprises a first header, a baffle which has a body extending in the first header roughly in the longitudinal direction of the first header and used to divide an inner chamber in the first header into a first chamber and a second chamber, two second headers, first heat exchange pipes which are connected between one of said two second headers and said first header and are in fluid communication with said one of said two second headers and the second chamber of said first header, first communicating pipes which are connected between said one of said two second headers and said first header and are in fluid communication with said one of said two second headers and the first chamber of said first header, second heat exchange pipes which are connected between the other one of said two second headers and said first header and are in fluid communication with said the other one of said two second headers and the first chamber of said first header, and second communicating pipes which are connected between said the other one of said two second headers and said first header and are in fluid communication with said the other one of said two second headers and the second chamber of said first header, wherein said heat exchanger is bent at a first bent portion between said the other one of said two second headers and said first header so that said the other one of said two second headers is higher or lower than said first header.

According to the embodiments of the present invention, said heat exchanger is bent at a second bent portion between said one of said two second headers and said first header so that said one of said two second headers is lower or higher than said first header.

According to the embodiments of the present invention, before the heat exchanger is bent, said first header is provided between said two second headers, and the first heat exchange pipes, first communicating pipes, second heat exchange pipes, and second communicating pipes extend roughly in the same direction.

According to the embodiments of the present invention, a refrigerant can flow from the first heat exchange pipes through said one of said two second headers and the first communicating pipes to the first chamber of said first header, then can flow from the first chamber of said first header to the second heat exchange pipes, and can flow from the second heat exchange pipes through said the other one of said two second headers and the second communicating pipes into the second chamber of said first header.

According to the embodiments of the present invention, a refrigerant is sealed in the heat exchanger and is circulated only in the heat exchanger.

According to the embodiments of the present invention, the first heat exchange pipes are connected to the first communicating pipes by connecting portions to form integral parts, and/or the second heat exchange pipes are connected to the second communicating pipes by connecting portions to form integral parts.

According to the embodiments of the present invention, said first bent portion is adjacent to the first header.

According to the embodiments of the present invention, said second bent portion is adjacent to the first header.

According to the embodiments of the present invention, a section of both the second heat exchange pipes and the second communicating pipes between said first bent portion and said the other one of said two second headers extends aslant upward or downward, or extends vertically upward or downward, from said first bent portion.

According to the embodiments of the present invention, the first heat exchange pipes, the first communicating pipes, and a section of both the second heat exchange pipes and the second communicating pipes between said first bent portion and the first header extend roughly in a horizontal direction or extend aslant.

According to the embodiments of the present invention, a section of both the second heat exchange pipes and the second communicating pipes between said first bent portion and said the other one of said two second headers extends aslant upward or downward, or extends vertically upward or downward, from said first bent portion, and a section of both the first heat exchange pipes and the first communicating pipes between said second bent portion and said one of said two second headers extends aslant downward or upward, or extends vertically downward or upward, from said second bent portion.

According to the embodiments of the present invention, a section of both the first heat exchange pipes and the first communicating pipes between said second bent portion and the first header and a section of both the second heat exchange pipes and the second communicating pipes between said first bent portion and the first header extend roughly in a horizontal direction.

According to the embodiments of the present invention, the first bent portion is roughly parallel to the first header or said the other one of said two second headers.

According to the embodiments of the present invention, the first bent portion is roughly parallel to the first header or said the other one of said two second headers, and the second bent portion is roughly parallel to the first header or said one of said two second headers.

According to the embodiments of the present invention, fins are provided between the first heat exchange pipes and between the second heat exchange pipes.

According to the embodiments of the present invention, fins are provided between the second heat exchange pipes excluding the first bent portion.

According to the embodiments of the present invention, fins are provided between the first heat exchange pipes excluding the second bent portion.

The embodiments of the present invention provide a heat exchanger. The heat exchanger comprises a first header which has an inner chamber, two second headers each of which has an inner chamber, first heat exchange pipes which are connected between one of said two second headers and said first header and are in fluid communication with the inner chamber of said one of said two second headers and the inner chamber of said first header, and second heat exchange pipes which are connected between the other one of said two second headers and said first header and are in fluid communication with the inner chamber of said the other one of said two second headers and the inner chamber of said first header, wherein said heat exchanger is bent at a first bent portion between said the other one of said two second headers and said first header so that said the other one of said two second headers is higher or lower than said first header.

According to the embodiments of the present invention, said heat exchanger is bent at a second bent portion between said one of said two second headers and said first header so that said one of said two second headers is lower or higher than said first header.

According to the embodiments of the present invention, before the heat exchanger is bent, said first header is provided between said two second headers, and the first heat exchange pipes and the second heat exchange pipes extend roughly in the same direction.

According to the embodiments of the present invention, said first bent portion is adjacent to the first header.

According to the embodiments of the present invention, said second bent portion is adjacent to the first header.

According to the embodiments of the present invention, a section of the second heat exchange pipes between said first bent portion and said the other one of said two second headers extends aslant upward or downward, or extends vertically upward or downward, from said first bent portion.

According to the embodiments of the present invention, the first heat exchange pipes and a section of the second heat exchange pipes between said first bent portion and the first header extends roughly in a horizontal direction.

According to the embodiments of the present invention, a section of the second heat exchange pipes between said first bent portion and said the other one of said two second headers extends aslant upward or downward, or extends vertically upward or downward, from said first bent portion, and a section of the first heat exchange pipes between said second bent portion and said one of said two second headers extends aslant downward or upward, or extends vertically downward or upward, from said second bent portion.

According to the embodiments of the present invention, a section of the first heat exchange pipes between said second bent portion and the first header and a section of the second heat exchange pipes between said first bent portion and the first header extend roughly in a horizontal direction or extend aslant.

According to the embodiments of the present invention, the first bent portion is roughly parallel to the first header or said the other one of said two second headers.

According to the embodiments of the present invention, the first bent portion is roughly parallel to the first header or said the other one of said two second headers, and the second bent portion is roughly parallel to the first header or said one of said two second headers.

The embodiments of the present invention provide an air conditioning system. The air conditioning system comprises the above-mentioned heat exchanger.

According to the embodiments of the present invention, said air conditioning system further comprises a casing in which said heat exchanger is located, and a partition wall which divides an inner space of the casing into a first partition and a second partition, wherein the part between one of the two second headers and the first header is located in one of the first partition and the second partition, and the part between the other one of the two second headers and the first header is located in the other one of the first partition and the second partition.

According to the embodiments of the present invention, said partition wall is located at the first header and divides the inner space of the casing into a first partition and a second partition.

The heat exchanger in the embodiments of the present invention can realize, for example, the functions of heat pipes. For example, evaporation and condensation are completed in the same heat exchanger. In addition, a height difference provides a motive power source for internal circulation to complete the two cycles of evaporation and condensation of a refrigerant.

The heat exchanger in the embodiments of the present invention can be used for a specific purpose, for example, in a specific position.

DETAILED DESCRIPTION

See FIGS. 1 to 11. The heat exchanger (100) in the embodiments of the present invention comprises a first header (1); a baffle (2); said baffle (2) having a body and said body extending in the first header (1) roughly in the longitudinal direction of the first header (1) and being used to divide an inner chamber in the first header (1) into a first chamber (A) and a second chamber (B); two second headers (3); first heat exchange pipes (51) which are connected between one of said two second headers (3) and said first header (1) and are in fluid communication with said one of said two second headers (3) and the second chamber (B) of said first header (1); first communicating pipes (61) which are connected between said one of said two second headers (3) and said first header (1) and are in fluid communication with said one of said two second headers (3) and the first chamber (A) of said first header (1); second heat exchange pipes (52) which are connected between the other one of said two second headers (3) and said first header (1) and are in fluid communication with said the other one of said two second headers (3) and the first chamber (A) of said first header (1); and second communicating pipes (62) which are connected between said the other one of said two second headers (3) and said first header (1) and are in fluid communication with said the other one of said two second headers (3) and the second chamber (B) of said first header (1). Said heat exchanger (100) is bent at a first bent portion (71) between said the other one of said two second headers (3) and said first header (1) so that said the other one of said two second headers (3) is higher or lower than said first header (1).

See FIGS. 1 to 11. Fins (8) are provided between the first heat exchange pipes (51) and between the second heat exchange pipes (52). Optionally, fins are provided between the second heat exchange pipes (52) excluding the first bent portion (71), and fins are provided between the first heat exchange pipes (51) excluding a second bent portion (72). No fins are provided between the first communicating pipes (61) or between the second communicating pipes (62). The fins (8) do not touch the first communicating pipes (61) or second communicating pipes (62).

As shown in FIGS. 8 to 11, according to some embodiments of the present invention, said heat exchanger (100) is bent at the second bent portion (72) between said one of said two second headers (3) and said first header (1) so that said one of said two second headers (3) is lower or higher than said first header (1). That is to say, if said the other one of said two second headers (3) is higher than said first header (1), said one of said two second headers (3) is lower than said first header (1); if said the other one of said second headers (3) is lower than said first header (1), said one of said two second headers (3) is higher than said first header (1). Optionally, said the other one of said two second headers (3) is higher than said one of said two second headers (3) or said the other one of said two second headers (3) is lower than said one of said two second headers (3).

Figure 1:
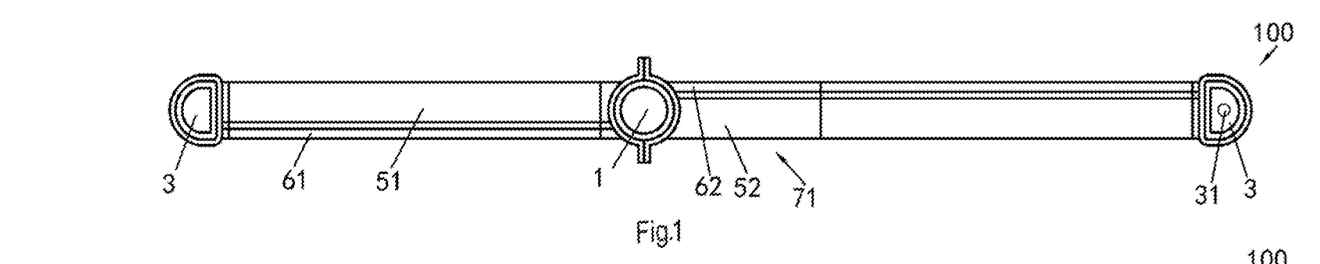
FIG. 1 is a front view of the heat exchanger before bending in a first embodiment of the present invention.
Figure 2:
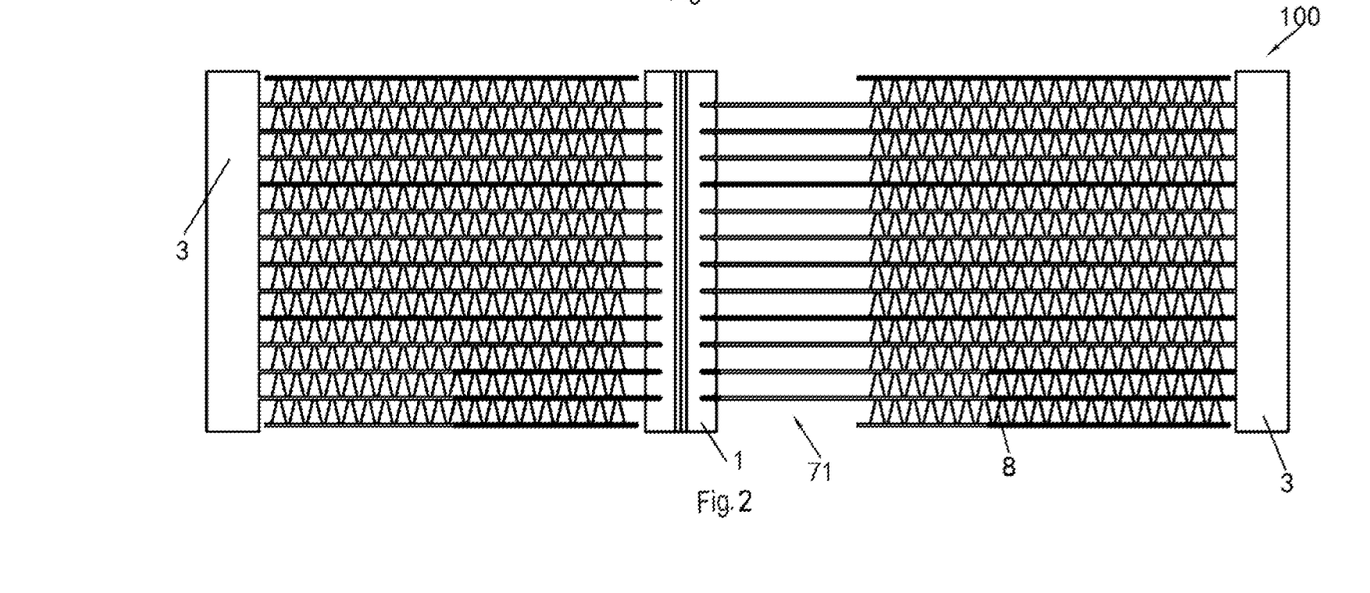
FIG. 2 is a top view of the heat exchanger before bending in the first embodiment of the present invention.
Figure 3:
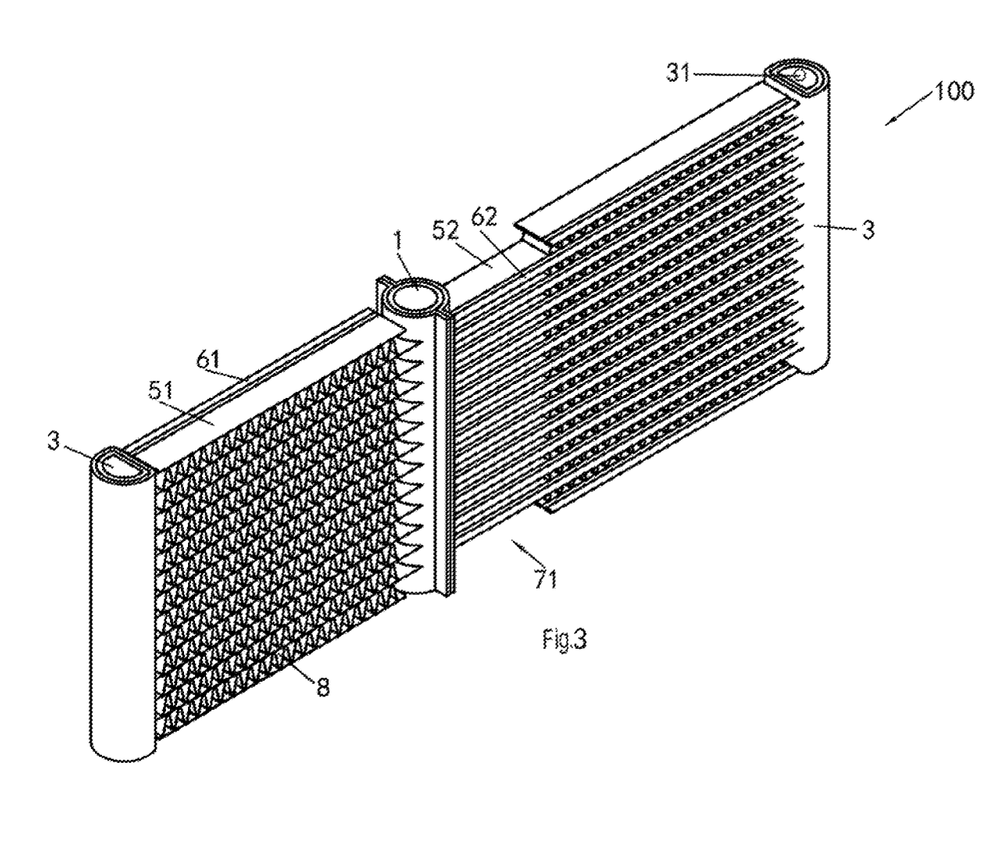
FIG. 3 is a 3-D view of the heat exchanger before bending in the first embodiment of the present invention.

As shown in FIGS. 1 to 3, according to the embodiments of the present invention, before the heat exchanger is bent, said first header (1) is provided between said two second headers (3), and the first heat exchange pipes (51), first communicating pipes (61), second heat exchange pipes (52), and second communicating pipes (62) extend roughly in the same direction. Said heat exchanger (100) roughly has a flat-plate shape, and has a first direction (for example, length direction) in which the first heat exchange pipes (51), first communicating pipes (61), second heat exchange pipes (52) and/or second communicating pipes (62) extend, a second direction (for example, width direction) in which the first heat exchange pipes (51), first communicating pipes (61), second heat exchange pipes (52) and/or second communicating pipes (62) are arranged, and a third direction (for example, thickness direction) which is roughly perpendicular to the first direction and the second direction, and the first bent portion (71) and the second bent portion (72) extend in a direction which intersects or is roughly perpendicular to the first direction. The first bent portion (71) and the second bent portion (72) are formed by bending the second heat exchange pipes (52) and the second communicating pipes (62), and bending the first heat exchange pipes (51) and the first communicating pipes (61).

See FIGS. 1 to 11. In the embodiments of the present invention, relative to the first bent portion (71), the heat exchanger (100) has a first part and a second part located on the two sides of the bent portion (71), and the included angle between the first part and the second part can be an acute angle, a right angle, or an obtuse angle. Relative to the first bent portion (71) and the second bent portion (72), the heat exchanger (100) has a first part located between the first bent portion (71) and the second bent portion (72), a second part located on the outer side of the first bent portion (71), and a third part located on the outer side of the second bent portion (72), the included angle between the first part and the second part can be an acute angle, a right angle, or an obtuse angle, and the included angle between the first part and the third part can be an acute angle, a right angle, or an obtuse angle. Said first bent portion (71) can be adjacent to the first header (1). In addition, said second bent portion (72) can be adjacent to the first header (1). The first bent portion (71) can roughly be parallel to the first header (1) or said the other one of said two second headers (3), and the second bent portion (72) can roughly be parallel to the first header (1) or said one of said two second headers (3).

Figure 4:
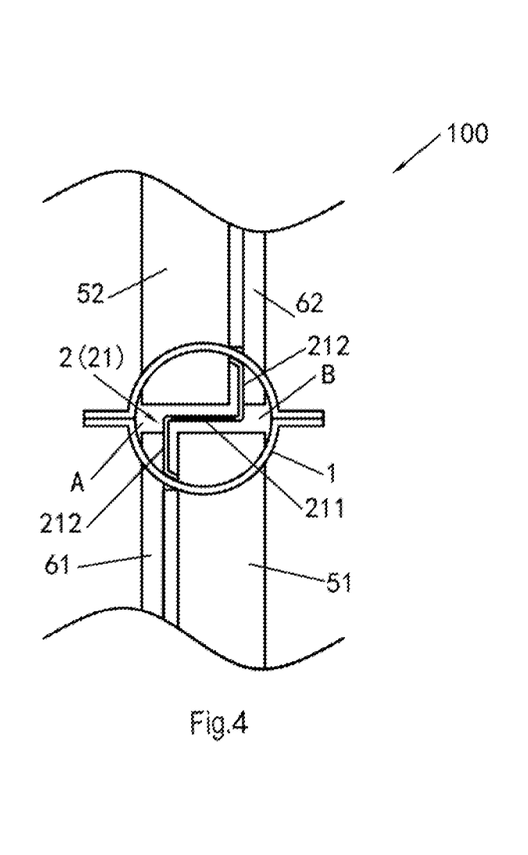
FIG. 4 is an enlarged partial view of the heat exchanger before bending in the first embodiment of the present invention.

See FIGS. 1 to 11, and especially FIG. 4. The refrigerant can flow from the first heat exchange pipes (51) through said one of said two second headers (3) and the first communicating pipes (61) to the first chamber (A) of said first header (1), then can flow from the first chamber (A) of said first header (1) to the second heat exchange pipes (52), and can flow from the second heat exchange pipes (52) through said the other one of said two second headers (3) and the second communicating pipes (62) in to the second chamber (B) of said first header (1). That is to say, the refrigerant in circulation flows through the following components in turn: first heat exchange pipes (51)→said one of said two second headers (3)→first communicating pipes (61)→the first chamber (A) of said first header (1)→second heat exchange pipes (52)→said the other one of said two second headers (3)→second communicating pipes (62)→the second chamber (B) of said first header (1)→first heat exchange pipes (51). The refrigerant is sealed in the heat exchanger (100) and is circulated only in the heat exchanger (100). The refrigerant can enter the heat exchanger (100) through an injection hole (31), and in addition, the injection hole (31) is used for vacuumizing the heat exchanger. The arrowed lines in the figures are used to indicate the direction in which the refrigerant flows.

See FIG. 4 and FIGS. 6 to 11. For example, the baffle (2) divides the inner chamber in the first header (1) into the first chamber (A) and the second chamber (B), and thus a condensation part and an evaporation part are formed. The second heat exchange pipes (52) constitute the condensation part. The purpose of no participation of the second communicating pipes (62) in heat exchange is to prevent a refrigerant gas moving upward from being condensed into a liquid ahead of time during the upward movement. If the refrigerant gas is condensed into a liquid ahead of time, the condensed liquid will flow backward to destroy the circulation. The first heat exchange pipes (51) constitute the evaporation part. A refrigerant liquid in the first communicating pipes (61) must not be evaporated ahead of time during downward (or roughly horizontal) movement. If the refrigerant liquid is evaporated ahead of time, the re-evaporation of the liquid flowing to one side of the first heat exchange pipes (51) will be affected, or even the circulation will be destroyed.

Figure 5:
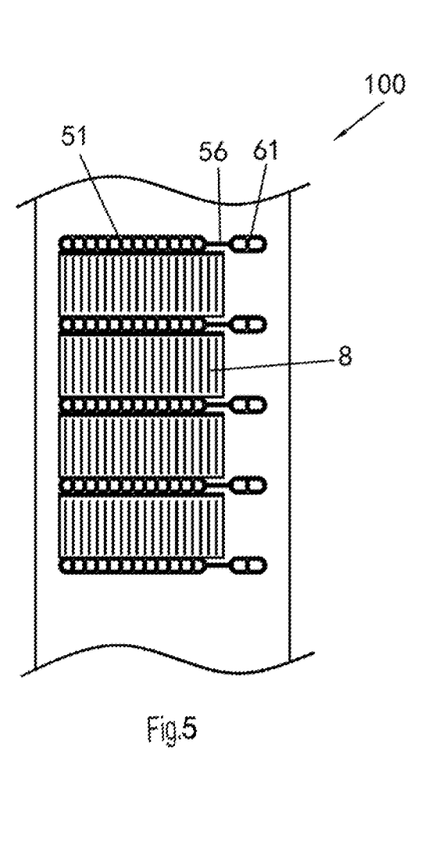
FIG. 5 is another enlarged partial view of the heat exchanger before bending in the first embodiment of the present invention.

See FIG. 5. The first heat exchange pipes (51) are connected to the first communicating pipes (61) by connecting portions (56) to form integral parts, and the second heat exchange pipes (52) are connected to the second communicating pipes (62) by connecting portions (56) to form integral parts. The first heat exchange pipes (51) and the first communicating pipes (61), and the second heat exchange pipes (52) and the second communicating pipes (62) can be made of flat pipes, or the integrated first heat exchange pipes (51) and first communicating pipes (61) can be made of flat pipes, and the integrated second heat exchange pipes (52) and second communicating pipes (62) can be made of flat pipes.

Figure 6:
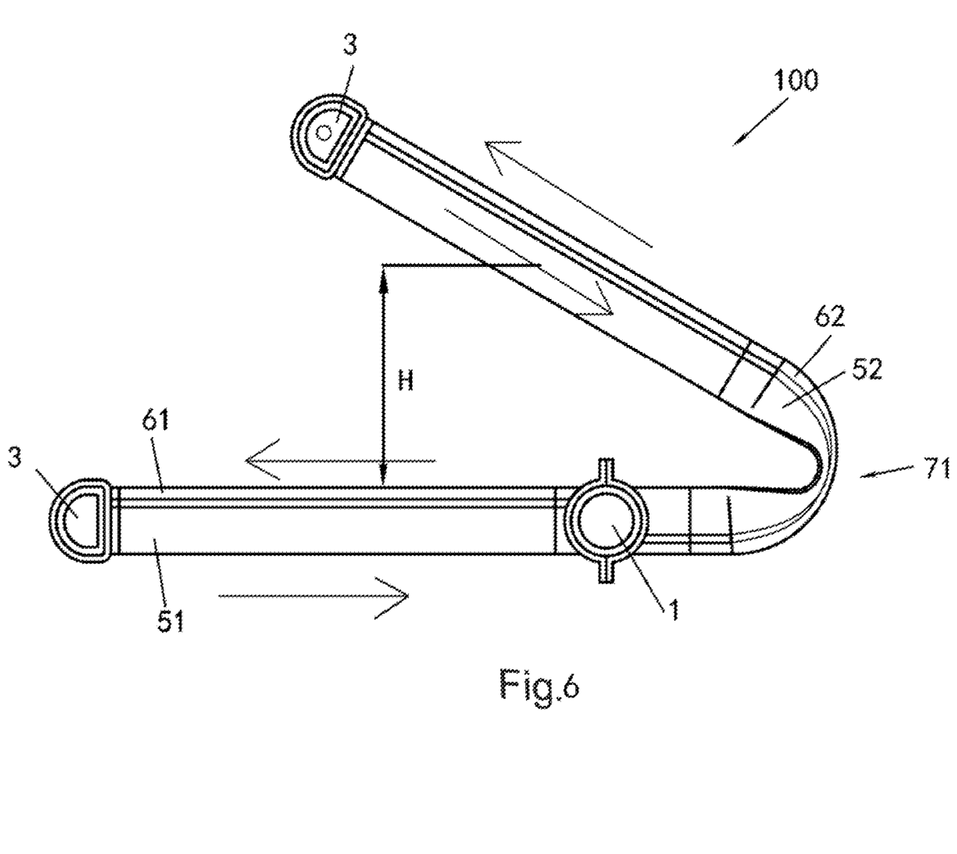
FIG. 6 is a front view of the heat exchanger after bending in the first embodiment of the present invention.
Figure 7:
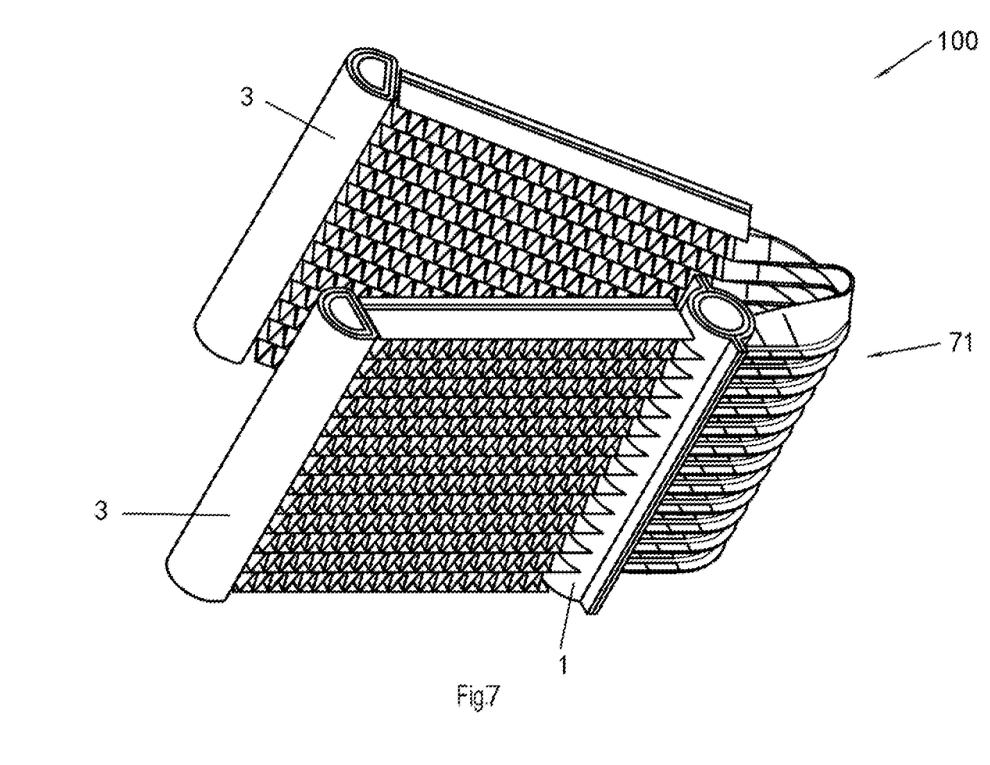
FIG. 7 is a 3-D view of the heat exchanger after bending in the first embodiment of the present invention.
Figure 8:
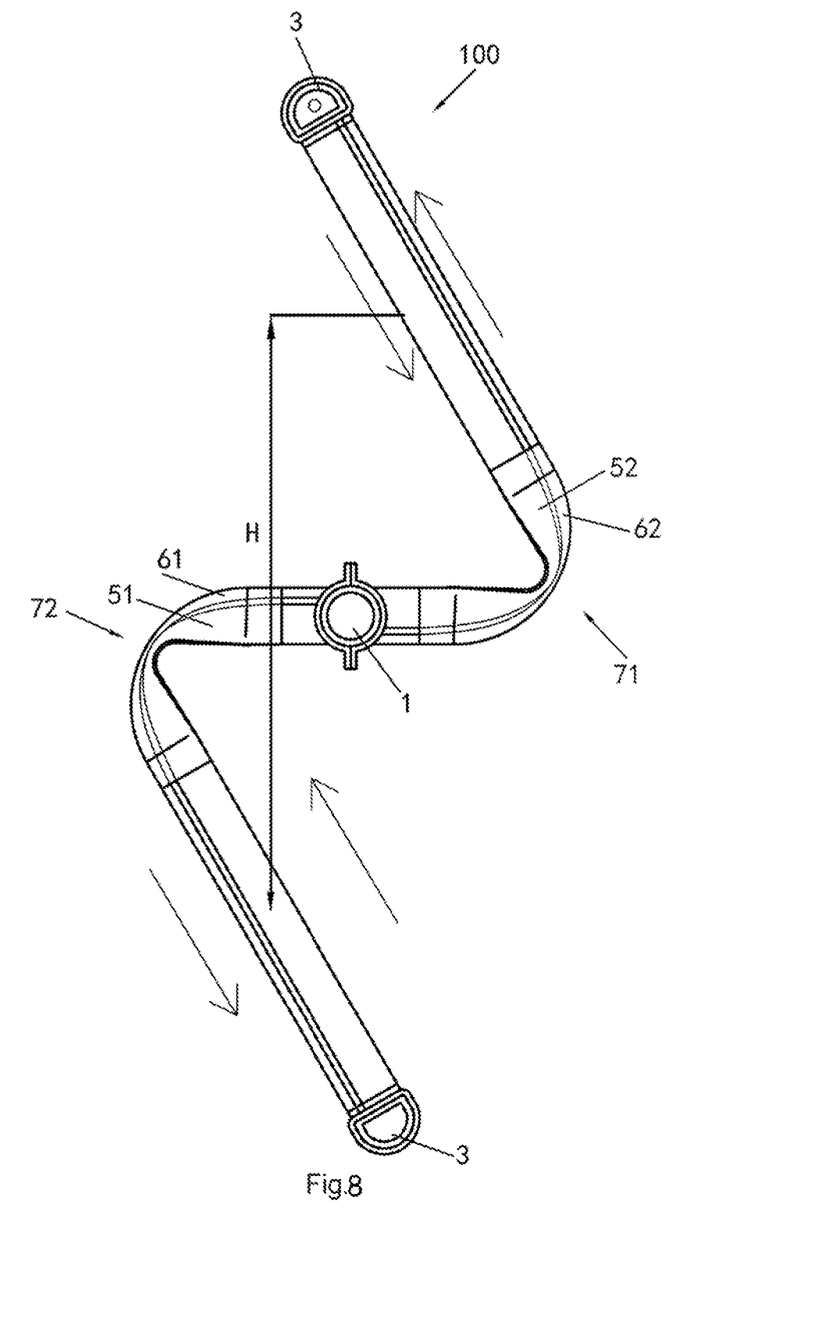
FIG. 8 is a front view of the heat exchanger after bending in a second embodiment of the present invention.
Figure 9:
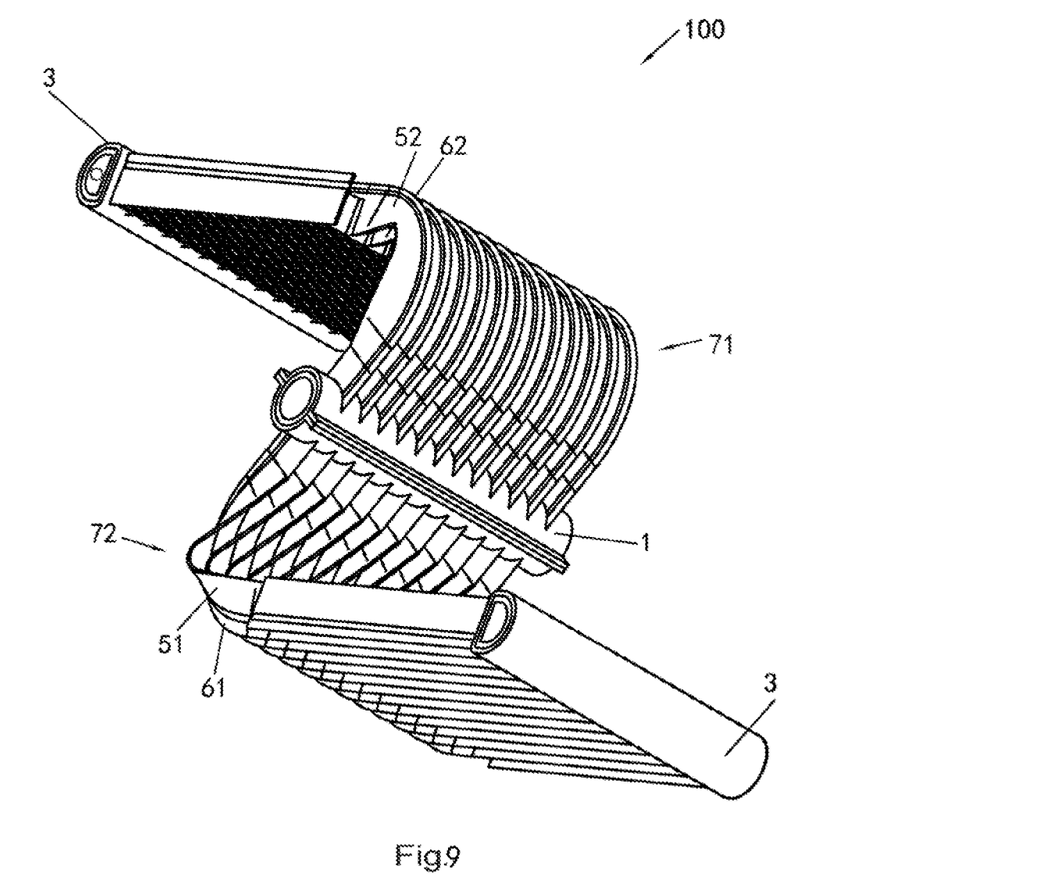
FIG. 9 is a 3-D view of the heat exchanger after bending in the second embodiment of the present invention.
Figure 10:
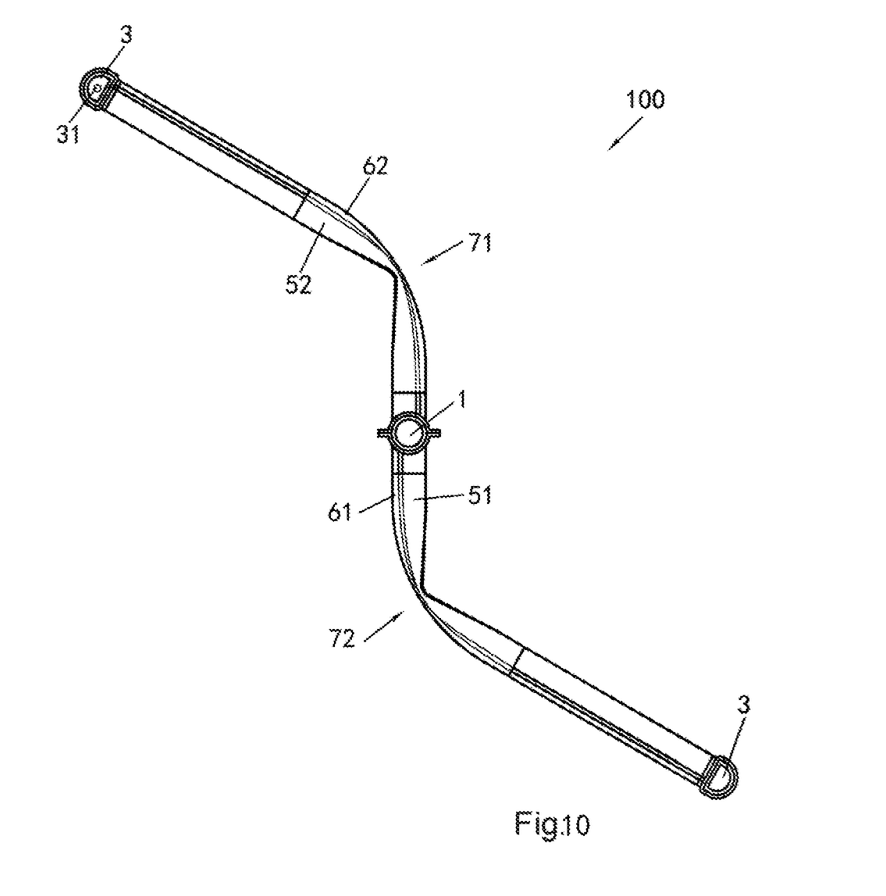
FIG. 10 is a front view of the heat exchanger after bending in a third embodiment of the present invention.
Figure 11:
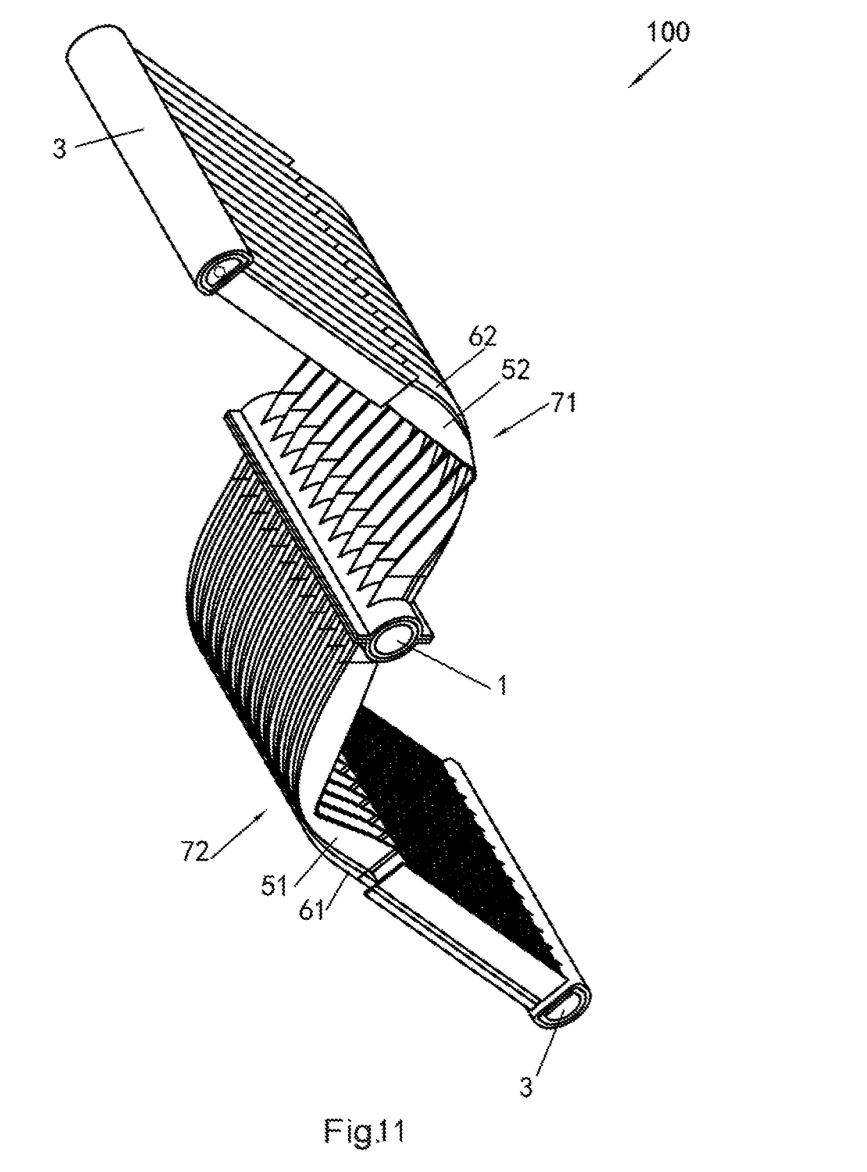
FIG. 11 is a 3-D view of the heat exchanger after bending in the third embodiment of the present invention.

See FIGS. 6 and 7. A section of both the second heat exchange pipes (52) and the second communicating pipes (62) between said first bent portion (71) and said the other one of said two second headers (3) extends aslant upward or downward, or extends vertically upward or downward, from said first bent portion (71). In FIGS. 6 and 7, the section extends aslant upward from said first bent portion (71). The first heat exchange pipes (51), the first communicating pipes (61), and a section of both the second heat exchange pipes (52) and the second communicating pipes (62) between said first bent portion (71) and the first header (1) can extend roughly in a horizontal direction.

See FIGS. 8 to 11. A section of both the second heat exchange pipes (52) and the second communicating pipes (62) between said first bent portion (71) and said the other one of said two second headers (3) extends aslant upward or downward, or extends vertically upward or downward (extending aslant upward in the figures), from said first bent portion (71), and a section of both the first heat exchange pipes (51) and the first communicating pipes (61) between said second bent portion (72) and said one of said two second headers (3) extends aslant downward or upward, or vertically downward or upward (extending aslant downward in the figures) from said second bent portion (72). A section of both the first heat exchange pipes (51) and the first communicating pipes (61) between said second bent portion (72) and the first header (1) and a section of both the second heat exchange pipes (52) and the second communicating pipes (62) between said first bent portion (71) and the first header (1) can extend roughly in a horizontal direction or extend aslant. In addition, except the first bent portion (71) and the second bent portion (72), each part of the first heat exchange pipes (51) and the first communicating pipes (61), and the second heat exchange pipes (52) and the second communicating pipes (62) can have the shape of a straight line or the shape of a curve.

For example, after the refrigerant is evaporated in the first heat exchange pipes (51), the refrigerant flows through one of the two headers (3) and the first communicating pipes (61) to the first chamber (A) of the header (1), then flows from the first chamber (A) to the second heat exchange pipes (52), is condensed in the second heat exchange pipes (52), and then flows through the other one of the two headers (3) and the second communicating pipes (62) into the second chamber (B) of the header (1) to form a circulation. At the time of installation, at least a part of the second heat exchange pipes (52) is located on the upper side of the first heat exchange pipes (51) and at least a part of the refrigerant in the second heat exchange pipes (52) flows aslant downward or vertically downward to provide motive power for internal circulation to complete the cycle of evaporation and condensation of the refrigerant.

As shown in FIGS. 4 and 5, according to the embodiments of the present invention, the cross-sectional area of the first heat exchange pipes (51) is greater than the cross-sectional area of the first communicating pipes (61), and the cross-sectional area of the second heat exchange pipes (52) is greater than the cross-sectional area of the second communicating pipes (62). The width of the first heat exchange pipes (51) is greater than the width of the first communicating pipes (61), and the width of the second heat exchange pipes (52) is greater than the width of the second communicating pipes (62). The heat exchange capacity of the first heat exchange pipes is higher than the heat exchange capacity of the first communicating pipes, and the heat exchange capacity of the second heat exchange pipes is higher than the heat exchange capacity of the second communicating pipes. For example, the number of flow passages in the first heat exchange pipes is larger than the number of flow passages in the first communicating pipes, the number of flow passages in the second heat exchange pipes is larger than the number of flow passages in the second communicating pipes, the flow area in the first heat exchange pipes is greater than the flow area in the first communicating pipes, and the flow area in the second heat exchange pipes is greater than the flow area in the second communicating pipes.

As shown in FIGS. 4 and 5, according to the embodiments of the present invention, said baffle (2) or the body (21) of said baffle (2) has a first part (211) and two second parts (212) extending transversely in opposite directions from the two longitudinally extending opposite edges of the first part (211), and longitudinal edges of the two second parts (212), which are respectively opposite the two edges of the first part (211), are connected to the inner wall of the first header (1). The two second parts (212) can roughly be perpendicular to the first part (211).

As shown in FIG. 4, according to the embodiments of the present invention, the width of the first part (211) is less than the size of the inner chamber of the first header (1) in the width direction of the first part (211) so that the two second parts (212) are located between the first heat exchange pipes (51) and the first communicating pipes (61) and between the second heat exchange pipes (52) and the second communicating pipes (62), respectively, in the width direction of the first part (211).

As shown in FIG. 4, according to the embodiments of the present invention, the first part (211) can pass through the axis of the first header (1). The first header (1) can have an inner chamber with a circular cross-section. Viewed from the cross-section, said baffle (2) or the body (21) of said baffle (2) is centrosymmetrical relative to the center of said baffle (2) or the center of the body (21) of said baffle (2).

As shown in FIGS. 4 and 5, according to the embodiments of the present invention, the first heat exchange pipes (51) and the second communicating pipes (62) are located on one side of the heat exchanger, while the first communicating pipes (61) and the second heat exchange pipes (52) are located on the other side of the heat exchanger. Said one side and said other side are opposite in a third direction.

In the above-mentioned embodiments, the first heat exchange pipes (51) and the first communicating pipes (61), and the second heat exchange pipes (52) and the second communicating pipes (62) can be made of flat pipes. In this case, for the convenience of the bending of the heat exchanger, the first heat exchange pipes (51) and the first communicating pipes (61), and the second heat exchange pipes (52) and the second communicating pipes (62) can be twisted at the bent portions to form twisted parts, and then the first heat exchange pipes (51) and the first communicating pipes (61), and the second heat exchange pipes (52) and the second communicating pipes (62) are bent.

The heat exchanger (100) in the embodiments of the present invention can be used as a heat pipe without motive power of a base station to solve the problem of heat radiation of communication devices. Evaporation and condensation required for the heat pipe are completed in the same heat exchanger. In addition, for the heat exchanger (100) in the embodiments of the present invention, a height difference (H) provides a motive power source for internal circulation to complete the two cycles of evaporation and condensation of the refrigerant.

The heat exchanger (100) in the embodiments of the present invention realizes both condensation and evaporation and has a compact structure. In addition, the bending structure of the heat exchanger (100) in the embodiments of the present invention has a wide range of variation and is easy to adjust.

Although the heat exchanger has the first communicating pipes (61) and the second communicating pipes (62) in the above-mentioned embodiments, the heat exchanger with bent portions in the present invention can have no communicating pipes.

Figure 12:
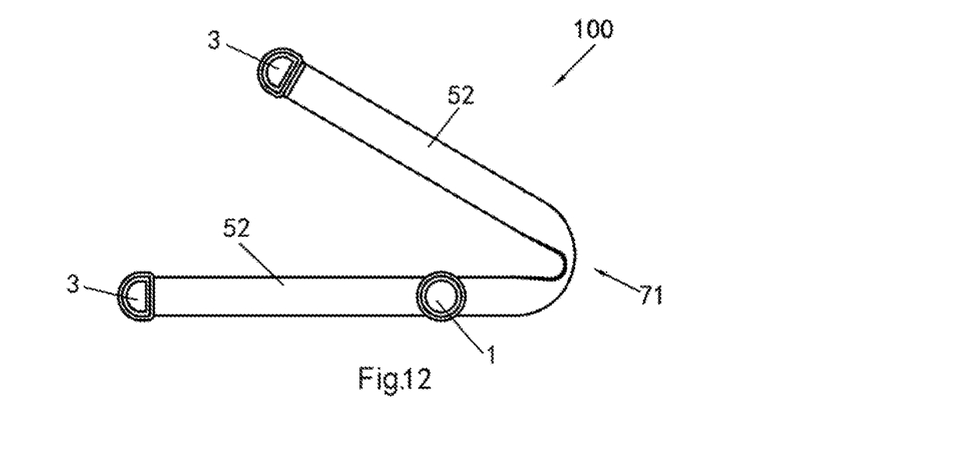
FIG. 12 is a front view of the heat exchanger after bending in a fourth embodiment of the present invention.

As shown in FIG. 12, the heat exchanger (100) comprises a first header (1) having an inner chamber, two second headers (3) having an inner chamber, first heat exchange pipes (51) which are connected between one of said two second headers (3) and said first header (1) and are in fluid communication with the inner chamber of said one of said two second headers (3) and the inner chamber of said first header (1), and second heat exchange pipes (52) which are connected between the other one of said two second headers (3) and said first header (1) and are in fluid communication with the inner chamber of said the other one of said two second headers (3) and the inner chamber of said first header (1). Said heat exchanger (100) is bent at the first bent portion (71) between said the other one of said two second headers (3) and said first header (1) so that said the other one of said two second headers (3) is higher or lower than said first header (1).

See FIGS. 1 to 12. Fins (8) are provided between the first heat exchange pipes (51) and between the second heat exchange pipes (52). Optionally, fins are provided between the second heat exchange pipes (52) excluding the first bent portion (71), and fins are provided between the first heat exchange pipes (51) excluding the second bent portion (72).

See FIGS. 8 to 12. According to some embodiments of the present invention, said heat exchanger (100) is bent at the second bent portion (72) between said one of said two second headers (3) and said first header (1) so that said one of said two second headers (3) is lower or higher than said first header (1). That is to say, if said the other one of said two second headers (3) is higher than said first header (1), said one of said two second headers (3) is lower than said first header (1); if said the other one of said two second headers (3) is lower than said first header (1), said one of said two second headers (3) is higher than said first header (1). Optionally, said the other one of said second headers (3) is higher than said one of said two second headers (3) or said the other one of said two second headers (3) is lower than said one of said two second headers (3).

See FIGS. 1 to 3. According to the embodiments of the present invention, before the heat exchanger is bent, said first header (1) is provided between said two second headers (3), and the first heat exchange pipes (51) and the second heat exchange pipes (52) extend roughly in the same direction. Said heat exchanger (100) roughly has a flat-plate shape, and has a first direction (for example, length direction) in which the first heat exchange pipes (51) and the second heat exchange pipes (52) extend, a second direction (for example, width direction) in which the first heat exchange pipes (51) and the second heat exchange pipes (52) are arranged, and a third direction (for example, thickness direction) which is roughly perpendicular to the first direction and the second direction, and the first bent portion (71) and the second bent portion (72) extend in a direction which intersects or is roughly perpendicular to the first direction. The first bent portion (71) and the second bent portion (72) are formed by bending the second heat exchange pipes (52) and the first heat exchange pipes (51).

See FIGS. 1 to 12. In the embodiments of the present invention, relative to the first bent portion (71), the heat exchanger (100) has a first part and a second part located on the two sides of the bent portion (71), and the included angle between the first part and the second part can be an acute angle, a right angle, or an obtuse angle. Relative to the first bent portion (71) and the second bent portion (72), the heat exchanger (100) has a first part located between the first bent portion (71) and the second bent portion (72), a second part located on the outer side of the first bent portion (71), and a third part located on the outer side of the second bent portion (72), the included angle between the first part and the second part can be an acute angle, a right angle, or an obtuse angle, and the included angle between the first part and the third part can be an acute angle, a right angle, or an obtuse angle. Said first bent portion (71) can be adjacent to the first header (1). In addition, said second bent portion (72) can be adjacent to the first header (1). The first bent portion (71) can roughly be parallel to the first header (1) or said the other one of said two second headers (3), and the second bent portion (72) can roughly be parallel to the first header (1) or said one of said two second headers (3).

The first heat exchange pipes (51) and the second heat exchange pipes (52) can be made of flat pipes.

See FIGS. 6, 7, and 12. A section of the second heat exchange pipes (52) between said first bent portion (71) and said the other one of said two second headers (3) extends aslant upward or downward, or extends vertically upward or downward, from said first bent portion (71). In FIGS. 6 and 7, the section extends aslant upward from said first bent portion (71). The first heat exchange pipes (51), a section of the second heat exchange pipes (52) between said first bent portion (71), and the first header (1) can extend roughly in a horizontal direction.

See FIGS. 8 to 12. A section of the second heat exchange pipes (52) between said first bent portion (71) and said the other one of said two second headers (3) extends aslant upward or downward, or extends vertically upward or downward (extending aslant upward in the figures), from said first bent portion (71), and a section of the first heat exchange pipes (51) between said second bent portion (72) and said one of said two second headers (3) extends aslant downward or upward, or vertically downward or upward (extending aslant downward in the figures) from said second bent portion (72). A section of the first heat exchange pipes (51) between said second bent portion (72) and the first header (1) and a section of the second heat exchange pipes (52) between said first bent portion (71) and the first header (1)

can extend roughly in a horizontal direction or extend aslant. In addition, except the first bent portion (71) and the second bent portion (72), each part of the first heat exchange pipes (51) and the second heat exchange pipes (52) can have the shape of a straight line or the shape of a curve.

The heat exchanger in the embodiments of the present invention can be used for a specific purpose, for example, in a specific position.

Figure 13:
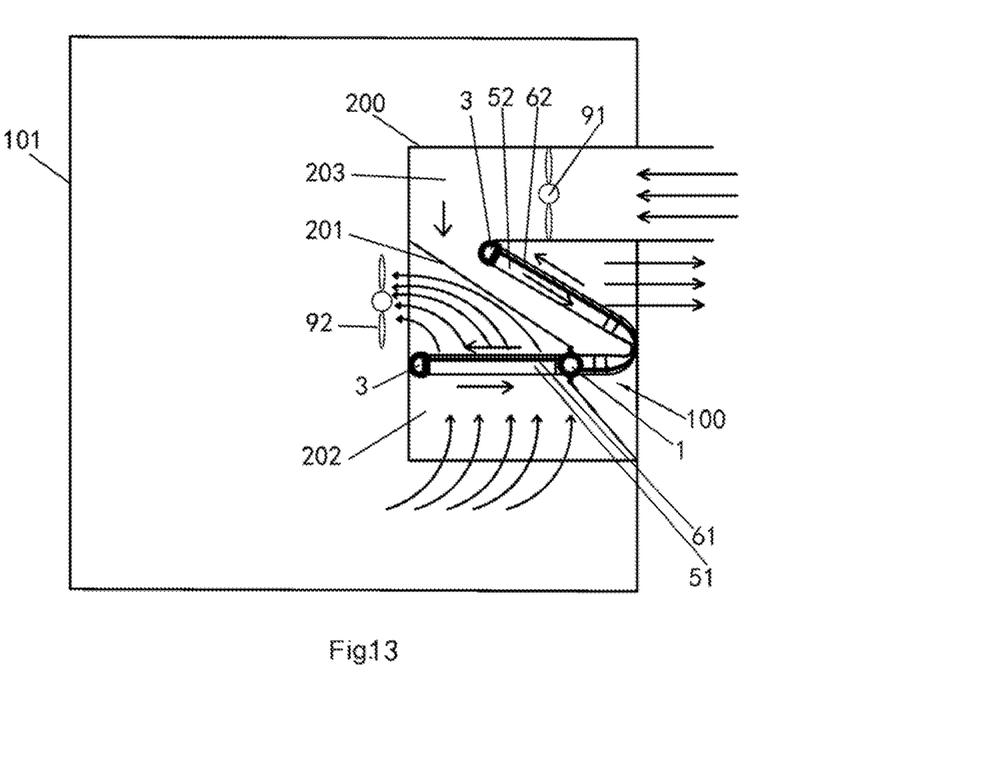
FIG. 13 is a schematic diagram of the air conditioning system in the embodiments of the present invention.

As shown in FIG. 13, the air conditioning system in the embodiments of the present invention comprises the above-mentioned heat exchanger (100). If the heat exchanger (100) in embodiments 1 to 3 is adopted, a heat pipe air conditioning system can be formed. The air conditioning system further comprises a casing (200), said heat exchanger (100) being located in said casing (200), and a partition wall (201) which divides the inner space of the casing (200) into a first partition (202) and a second partition (203), wherein the part between one of the two second headers (3) and the first header (1) is located in one of the first partition (202) and the second partition (203), and the part between the other one of the two second headers (3) and the first header (1) is located in the other one of the first partition (202) and the second partition (203). Said partition wall (201) is located at the first header (1) and divides the inner space of the casing (200) into the first partition (202) and the second partition (203).

The second heat exchange pipes (52) in the second partition (203) constitute the condensation part, the first heat exchange pipes (51) in the first partition (202) constitute the evaporation part, the partition wall (201) thermally insulates the two parts and can be made of a metal plate and a thermal insulation material.

Operational principle of the condensation part: Air from outside a room (101) is blown by a condensation fan (91) to one side of the heat exchanger (100), wherein the second heat exchange pipes (52) are the windward side and the second communicating pipes (62) are the leeward side; a refrigerant gas flows from the second communicating pipes (62) through the second header (3) into the second heat exchange pipes (52) and is condensed into a liquid in the second heat exchange pipes (52), and the liquid flows via the first header (1) into the evaporation part. After heat exchange, the air from outside the room (101) is discharged back to the outside of the room (101).

Operational principle of the evaporation part: Air from inside a room (101) is blown by an evaporation fan (92) to one side of the heat exchanger (100), wherein the first heat exchange pipes (51) are the windward side and the first communicating pipes (61) are the leeward side; the refrigerant liquid flows from the first communicating pipes (61) through the second header (3) into the first heat exchange pipes (51) and is evaporated into a gas in the first heat exchange pipes (51), and the gas flows via the first header (1) into the condensation part. The cooled air from inside the room (101) is sent back into the room to lower the temperature of the air in the room.

At least a part of the condensation part is located on the upper side of the evaporation part, and at least a part of refrigerant in the heat exchange pipes of the condensation part flows aslant downward or vertically downward to provide motive power for the internal circulation to complete the cycle of evaporation and condensation of the refrigerant.

The structure of the air conditioning system in the embodiments of the present invention is simple and compact so that the weight and installation area of the air conditioning system are reduced. The parts or heat exchange pipes between the first header (1) and one of the second headers (3) of a heat exchanger constitute the condensation part, while the parts or heat exchange pipes between the first header (1) and the other one of the second headers (3) of a heat exchanger constitute the evaporation part. Thus, a heat exchanger as a module unit realizes condensation and evaporation simultaneously. Compared with a conventional split heat pipe (a condensation unit and an evaporation unit connected by a pipe), the heat exchanger has the advantages of simple structure and high efficiency.

In addition, new embodiments can be formed by combining the above-mentioned embodiments of the present invention.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A heat exchanger, comprising:
a first header,
a baffle which has a body, the body being disposed in the first header, extending roughly in the longitudinal direction of the first header, and being used to divide an inner chamber in the first header into a first chamber and a second chamber,
two second headers,
first heat exchange pipes which are connected between one of said two second headers and said first header and are in fluid communication with said one of said two second headers and the second chamber of said first header,
first communicating pipes which are connected between said one of said two second headers and said first header and are in fluid communication with said one of said two second headers and the first chamber of said first header,
second heat exchange pipes which are connected between the other one of said two second headers and said first header and are in fluid communication with said the other one of said two second headers and the first chamber of said first header, and
second communicating pipes which are connected between said the other one of said two second headers and said first header and are in fluid communication with said the other one of said two second headers and the second chamber of said first header,
wherein said heat exchanger is bent at a first bent portion between said the other one of said two second headers and said first header so that said the other one of said two second headers is higher or lower than said first header.

2. The heat exchanger as claimed in claim 1, wherein said heat exchanger is bent at a second bent portion between said one of said two second headers and said first header so that said one of said two second headers is lower or higher than said first header.

3. The heat exchanger as claimed in claim 1, wherein before the heat exchanger is bent, said first header is provided between said two second headers, and the first heat exchange pipes, first communicating pipes, second heat exchange pipes, and second communicating pipes extend roughly in the same direction.

4. The heat exchanger as claimed in claim 1, wherein a refrigerant can flow from the first heat exchange pipes through said one of said two second headers and the first communicating pipes to the first chamber of said first header, then can flow from the first chamber of said first header to the second heat exchange pipes, and can flow from the second heat exchange pipes through said the other one of said two second headers and the second communicating pipes into the second chamber of said first header.

5. The heat exchanger as claimed in claim 1, wherein a refrigerant is sealed in the heat exchanger and is circulated only in the heat exchanger.

6. The heat exchanger as claimed in claim 1, wherein the first heat exchange pipes are connected to the first communicating pipes by connecting portions to form integral parts, and/or
the second heat exchange pipes are connected to the second communicating pipes by connecting portions to form integral parts.

7. The heat exchanger as claimed in claim 1, wherein a section of both the second heat exchange pipes and the second communicating pipes between said first bent portion and said the other one of said two second headers extends aslant upward or downward, or extends vertically upward or downward, from said first bent portion.

8. The heat exchanger as claimed in claim 1, wherein the first heat exchange pipes, the first communicating pipes, and a section of both the second heat exchange pipes and the second communicating pipes between said first bent portion and the first header extend roughly in a horizontal direction.

9. The heat exchanger as claimed in claim 2, wherein a section of both the second heat exchange pipes and the second communicating pipes between said first bent portion and said the other one of said two second headers extends aslant upward or downward, or extends vertically upward or downward, from said first bent portion, and
a section of both the first heat exchange pipes and the first communicating pipes between said second bent portion and said one of said two second headers extends aslant downward or upward, or extends vertically downward or upward, from said second bent portion.

10. The heat exchanger as claimed in claim 2, wherein a section of both the first heat exchange pipes and the first communicating pipes between said second bent portion and the first header and a section of both the second heat exchange pipes and the second communicating pipes between said first bent portion and the first header extend roughly in a horizontal direction or extend aslant.

11. The heat exchanger as claimed in claim 1, wherein the first bent portion is roughly parallel to the first header or said the other one of said two second headers.

12. The heat exchanger as claimed in claim 2, wherein the first bent portion is roughly parallel to the first header or said the other one of said two second headers, and the second bent portion is roughly parallel to the first header or said one of said two second headers.

13. The heat exchanger as claimed in claim 1, wherein fins are provided between the first heat exchange pipes and between the second heat exchange pipes.

14. The heat exchanger as claimed in claim 1, wherein fins are provided between the second heat exchange pipes excluding the first bent portion.

15. The heat exchanger as claimed in claim 2, wherein fins are provided between the first heat exchange pipes excluding the second bent portion.

16. A heat exchanger, comprising:
a first header which has an inner chamber,
two second headers, each of which has an inner chamber,
first heat exchange pipes which are connected between one of said two second headers and said first header and are in fluid communication with the inner chamber of said one of said two second headers and the inner chamber of said first header, and
second heat exchange pipes which are connected between the other one of said two second headers and said first header and are in fluid communication with the inner chamber of said the other one of said two second headers and the inner chamber of said first header,
wherein said heat exchanger is bent at a first bent portion between said the other one of said two second headers and said first header so that said the other one of said two second headers is higher or lower than said first header, and
wherein the first heat exchange pipes connect to the first header on a first side of the first header and the second heat exchange pipes connect to the first header a second side of the first header, the second side being opposite to the first side.

17. The heat exchanger as claimed in claim 16, wherein said heat exchanger is bent at a second bent portion between said one of said two second headers and said first header so that said one of said two second headers is lower or higher than said first header.

18. The heat exchanger as claimed in claim 16, wherein before the heat exchanger is bent, said first header is provided between said two second headers, and the first heat exchange pipes and the second heat exchange pipes extend roughly in the same direction.

19. The heat exchanger as claimed in claim 16, wherein a section of the second heat exchange pipes between said first bent portion and said the other one of said two second headers extends aslant upward or downward, or extends vertically upward or downward, from said first bent portion.

20. The heat exchanger as claimed in claim 16, wherein the first heat exchange pipes and a section of the second heat exchange pipes between said first bent portion and the first header extend roughly in a horizontal direction.

21. The heat exchanger as claimed in claim 17, wherein a section of the second heat exchange pipes between said first bent portion and said the other one of said two second headers extends aslant upward or downward, or extends vertically upward or downward, from said first bent portion, and
a section of the first heat exchange pipes between said second bent portion and said one of said two second headers extends aslant downward or upward, or extends vertically downward or upward, from said second bent portion.

22. The heat exchanger as claimed in claim 17, wherein a section of the first heat exchange pipes between said second bent portion and the first header and a section of the second heat exchange pipes between said first bent portion and the first header extend roughly in a horizontal direction or extend aslant.

23. The heat exchanger as claimed in claim 16, wherein the first bent portion is roughly parallel to the first header or said the other one of said two second headers.

24. The heat exchanger as claimed in claim 17, wherein the first bent portion is roughly parallel to the first header or said the other one of said two second headers, and the second bent portion is roughly parallel to the first header or said one of said two second headers.

25. An air conditioning system, comprising:
the heat exchanger as claimed in claim 1.

26. The air conditioning system as claimed in claim 25, further comprising:
a casing in which said heat exchanger is located, and
a partition wall which divides an inner space of the casing into a first partition and a second partition, wherein the part between one of the two second headers and the first header is located in one of the first partition and the second partition, and the part between the other one of the two second headers and the first header is located in the other one of the first partition and the second partition.

27. The air conditioning system as claimed in claim 26, wherein
said partition wall is located at the first header and divides the inner space of the casing into the first partition and the second partition.

28. The heat exchanger as claimed in claim 1, wherein the first heat exchange pipes connect to the first header on a first side of the first header and the second heat exchange pipes connect to the first header a second side of the first header, the second side being opposite to the first side.

29. A heat exchanger, comprising:
a first header which has an inner chamber,
two second headers, each of which has an inner chamber,
first heat exchange pipes which are connected between one of said two second headers and said first header and are in fluid communication with the inner chamber of said one of said two second headers and the inner chamber of said first header, and
second heat exchange pipes which are connected between the other one of said two second headers and said first header and are in fluid communication with the inner chamber of said the other one of said two second headers and the inner chamber of said first header,
wherein said heat exchanger is bent at a first bent portion between said the other one of said two second headers and said first header so that said the other one of said two second headers is higher or lower than said first header, and
wherein said heat exchanger is not bent between said one of said two second headers and said first header.

* * * * *